Figures 1, 2, 3:
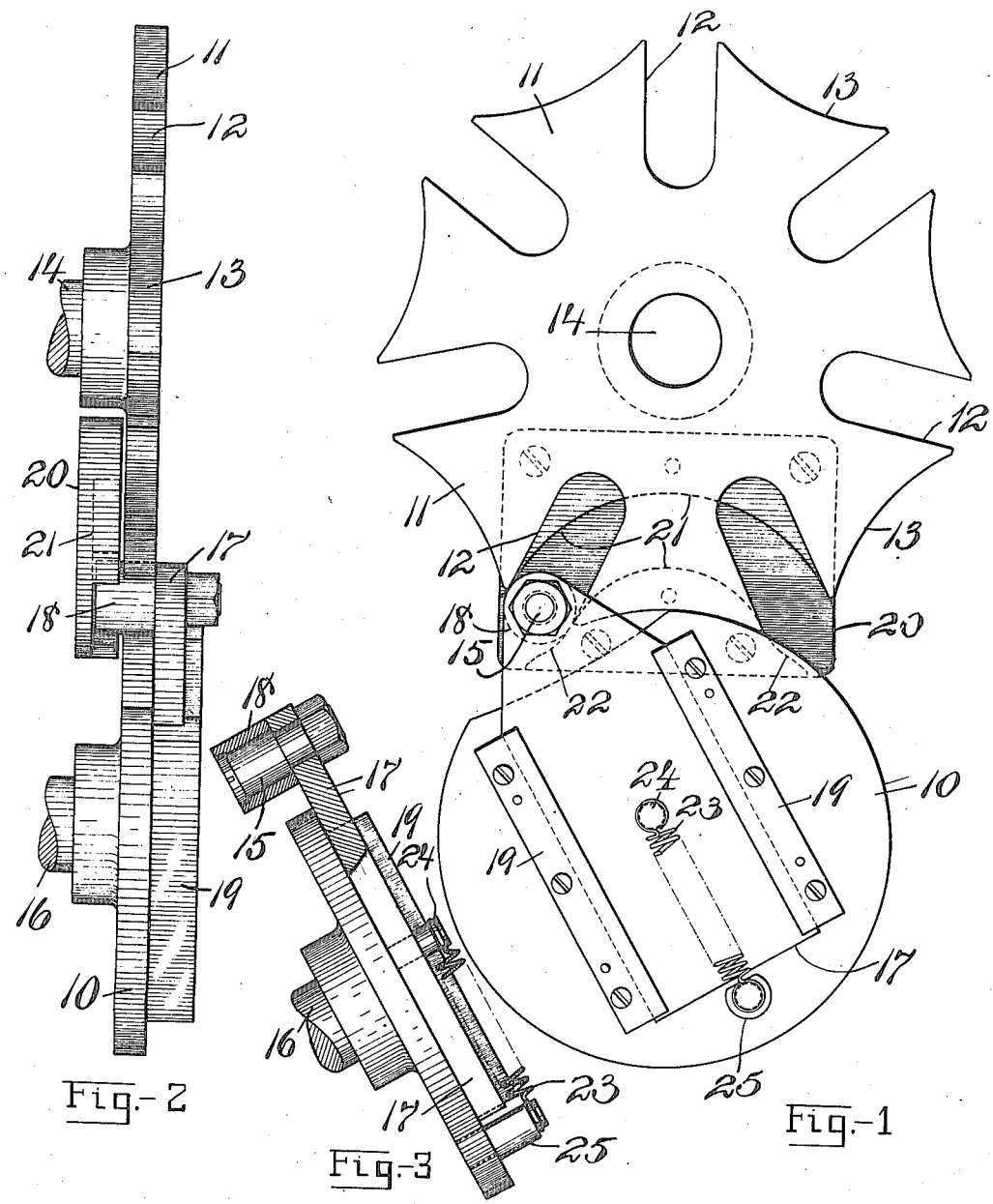

C. F. SCHWEITZER.
MECHANICAL MOVEMENT.
APPLICATION FILED JUNE 13, 1916.

1,221,097.

Patented Apr. 3, 1917.

Inventor
Chas. F. Schweitzer.
By Dyke & Canfield,
Attorney

UNITED STATES PATENT OFFICE.

CHARLES F. SCHWEITZER, OF NEWARK, NEW JERSEY.

MECHANICAL MOVEMENT.

1,221,097.  Specification of Letters Patent.  Patented Apr. 3, 1917.

Application filed June 13, 1916. Serial No. 103,369.

*To all whom it may concern:*

Be it known that I, CHARLES F. SCHWEITZER, a citizen of the United States, and a resident of Newark, county of Essex, and State of New Jersey, have invented certain new and useful Improvements in Mechanical Movements, of which the following is a specification.

This invention relates to an improved mechanical movement and is of the type known as a Geneva movement.

The invention is designed to provide a means for transforming a continuous, rotary movement to an intermittent, rotary movement by means of a revolving pin successively engaging slots in a slotted disk, the engagement of the pin with the walls of the slot being controlled so as to vary the ratios of their respective rotations. In other words, the pin can be caused to enter and leave a slot in the disk in such a manner that the driven member, that is, the slotted disk, is started slowly, then moved rapidly and then stopped slowly.

Such regulation is useful in many instances, such as when the disk is used for advancing the film of a motion picture machine. When started suddenly by the old form of Geneva movement the films are broken, whereas in this new form the shock or strain of starting is modified, so that the film is not broken by such starting.

The invention further provides a movement of this kind in which the number of stops per revolution of the driven member can be changed by placing a different driven member and guiding means which can be used with the same driving member.

The invention is illustrated in the accompanying drawing, in which Figure 1 is a face view of my improved mechanical movement. Fig. 2 is an edge view of the mechanism shown in Fig. 1, and Fig. 3 is a detail of a driving member partly broken away to more clearly illustrate its construction.

The drawing shows one form of mechanical movement embodying my invention, but minor changes in the arrangement of the parts and in the details of construction can be made without departing from the invention.

The form shown in the drawing comprises a driving member 10 and a driven member 11, the driven member rotating intermittently while the driving member rotates continuously, the major portion of the driving member being made convex and the driven member having slots 12 the spaces between which are concave as at 13 to fit on the convex portion of the driving member to provide a locking means to prevent rotation of the driven member except when it is positively driven by the driving member, the driving member having a pin or its equivalent which engages the slots 12 successively and thus gives the intermittent motion to the driven member. The driven member is fastened to a shaft 14, or is otherwise suitably secured to mechanism to which its motion is to be imparted. The driving member is provided with a pin, such as 15, which is adapted to enter the slots 12 and is held so that it rotates with the driving member 10, which driving member is suitably secured to a driving shaft 16 or other mechanism from which it receives its power. The pin 15 is mounted so that it is positively rotated with the driving member but is movable in a radial direction, the form shown comprising a slide 17 on which the pin 15 is mounted, the pin 15 being preferably provided with a roller 18 to minimize the friction and to make it easy to replace the member when it is worn. The slide 17 fits in guides 19 fastened to the driving member, which guides permit the slide to move easily but at the same time they assure the slide and its pin 15 being carried positively in order to convey motion to the driven member. The pin of the driving member is controlled so as to regulate its path while it is in contact with the driven member and the form of regulating mechanism shown comprises a plate 20 which has a slot 21 in which the roller 18 of the pin 15 is adapted to operate. The plate 20 is fixed in position, and I show, in Fig. 1, screw heads in dotted outline to indicate one form of securing this fixed member in position. The slot 21 moves the pin so that the radius on which it swings can be altered to shift its center from the center of rotation of the driving member, the drawing showing a slot of smaller radius than the driving member and having the ends of the slot formed, as at 22, so as to cause the pin of the driving member to enter each slot 12 in such a manner that the blow against the wall of the slot is not perpendicular thereto nor substantially perpendicular, but it engages the slot first at an angle that is very acute to the angle of the slot that first receives the impact of the pin. This permits the driven member to be started slowly, and a similar disposition of the slot 21 at the other end provides for an easy release of the driving member from the driven member, the curvature, however, of the slot between its ends being such as to move the driven member with the required speed.

Means for holding the pin of the driving member in normal position can be provided, the means illustrated comprising the spring 23 which is fastened, at 24, to the slide 17 and to a stud 25 which is secured to the disk of the driving member 10.

It will also be evident that with the same driving member a driven member with a different number of slots than that shown and a correspondingly changed guiding plate or other means can be employed to give various numbers of intermittent motions per revolution of the driven member in relation to a given number of revolutions of the driving member.

Having thus described my invention, I claim:

1. A mechanical movement comprising a rotating driving member having a pin thereon, a driven member in the path of the pin and adapted to be intermittently rotated thereby, and a fixed member for engaging the pin and giving it a movement eccentric to the movement of the driving member.

2. A mechanical movement comprising a driving member having a substantially even rotation, a driven member adapted to be intermittently rotated by contact with the driving member, and means for varying the speed of the driven member while it is operated by the driving member.

3. A mechanical movement comprising a rotating driving member having a pin thereon, said pin being movable toward and from the center of the member, a driven member having slots to receive the pin, and guiding means for regulating the position of the pin in said slots.

4. A mechanical movement comprising a rotating driving member, a movable pin on said member, a fixed member having guiding means for changing the path of travel of the pin so as to make it eccentric to the center of rotation of the driving member, and a slotted driven member to be engaged by the pin and intermittently rotated, the driven member being disposed so that it is engaged by the pin while the pin is guided by the fixed member.

5. A mechanical movement comprising a driving member adapted to continuously rotate, a slide on the driving member, a pin carried by the slide, means for moving the slide while the driving member is rotating, a driven member adapted to be engaged by the pin and thus adapted to be intermittently rotated.

6. A mechanical movement comprising a rotating driving member, a radially arranged slide on said driving member, a pin on the slide, a driven member having slots, said slots being adapted to be successively engaged by the pin whereby the driven member is intermittently rotated, and means for moving the slide so as to regulate its contact with the driven member.

7. A mechanical movement comprising a rotating driving member, a radially arranged slide movable on the driving member, a pin on the slide, a spring to hold the slide in a normal position, a driven member having slots extending from its periphery, said slots being adapted to be successively engaged by the pin to give the driven member an intermittent rotary motion, and means for moving the slide to vary the throw of the pin.

8. A mechanical movement comprising a rotating driving member, a radially arranged slide movable on the driving member, a pin on the slide, a spring to hold the slide in a normal position, a driven member having slots extending from its periphery, said slots being adapted to be successively engaged by the pin to give the driven member an intermittent rotary motion, and a plate having a slot therein, said slot being adapted to receive the pin and guide said pin during its travel adjacent to said driven member.

9. A mechanical movement comprising a driving member, a driven member having slots therein, a pin on said driving member and adapted to project into and beyond said driven member, means beyond said driven member for engaging the pin to control its movement adjacent to said driven member, and means for mounting the pin on said driving member whereby it is movable thereon in a radial direction.

In testimony that I claim the foregoing, I have hereto set my hand, this 10th day of June, 1916.

CHARLES F. SCHWEITZER.